(12) United States Patent
Li

(10) Patent No.: US 10,771,238 B2
(45) Date of Patent: *Sep. 8, 2020

(54) SECURE DATA TRANSACTIONS

(71) Applicant: Alibaba Group Holding Limited, George Town (KY)

(72) Inventor: Yi Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 191 days.

This patent is subject to a terminal disclaimer.

(21) Appl. No.: 15/902,724

(22) Filed: Feb. 22, 2018

(65) Prior Publication Data

US 2018/0247063 A1   Aug. 30, 2018

(30) Foreign Application Priority Data

Feb. 24, 2017   (CN) .......................... 2017 1 0102824

(51) Int. Cl.
*H04L 29/06* (2006.01)
*H04L 9/06* (2006.01)
(Continued)

(52) U.S. Cl.
CPC .......... *H04L 9/0637* (2013.01); *G06F 21/602* (2013.01); *G06F 21/62* (2013.01); *G06F 21/645* (2013.01); *G06Q 20/02* (2013.01); *G06Q 20/04* (2013.01); *G06Q 20/065* (2013.01); *G06Q 20/36* (2013.01); *G06Q 20/382* (2013.01); *G06Q 20/3827* (2013.01); *G06Q 20/3829* (2013.01); *H04L 9/083* (2013.01); *H04L 9/0819* (2013.01);
(Continued)

(58) Field of Classification Search
CPC . H04L 2209/38; H04L 9/0637; G06F 21/602; G06F 21/62
See application file for complete search history.

(56) References Cited

U.S. PATENT DOCUMENTS 6,453,356 B1   9/2002   Sheard et al.
7,023,838 B1   4/2006   Hahn et al.
(Continued)

FOREIGN PATENT DOCUMENTS

CN   104270380   1/2015
CN   104581712   4/2015
(Continued)

OTHER PUBLICATIONS

International Preliminary Report on Patentability Chapter II in International Application No. PCT/US2018/019464, dated May 14, 2019, 22 pages.
(Continued)

*Primary Examiner* — Dao Q Ho
(74) *Attorney, Agent, or Firm* — Fish & Richardson P.C.

(57) ABSTRACT

A data exchange agreement between a first user and a second user is written, by a data exchange platform, into a block chain. The data exchange agreement is associated with first data. A first key is received, by the data exchange platform and from a first device associated with the first user. The first key is used for decrypting encrypted first data. The received first key is transmitted by the data exchange platform to a second device associated with the second user.

17 Claims, 6 Drawing Sheets

(51) Int. Cl.

| | |
|---|---|
| *G06F 21/64* | (2013.01) |
| *H04L 9/08* | (2006.01) |
| *G06Q 20/02* | (2012.01) |
| *H04L 9/14* | (2006.01) |
| *H04L 9/32* | (2006.01) |
| *G06Q 20/36* | (2012.01) |
| *G06Q 20/38* | (2012.01) |
| *G06Q 20/06* | (2012.01) |
| *G06Q 20/04* | (2012.01) |
| *G06F 21/60* | (2013.01) |
| *G06F 21/62* | (2013.01) |
| *H04W 12/04* | (2009.01) |

(52) U.S. Cl.
CPC .............. *H04L 9/14* (2013.01); *H04L 9/3239* (2013.01); *H04L 63/0428* (2013.01); *H04L 63/062* (2013.01); *H04L 63/12* (2013.01); *H04L 63/06* (2013.01); *H04L 2209/38* (2013.01); *H04L 2209/56* (2013.01); *H04W 12/04* (2013.01)

(56) References Cited

U.S. PATENT DOCUMENTS

| | | | |
|---|---|---|---|
| 8,325,194 B1 | 12/2012 | Mrazek et al. | |
| 8,862,518 B2 | 10/2014 | Ching | |
| 9,367,487 B1 | 6/2016 | Mrazek et al. | |
| 9,397,985 B1 | 7/2016 | Seger, II et al. | |
| 9,613,154 B2 | 4/2017 | Qu | |
| 9,679,276 B1 * | 6/2017 | Cuende ................ | G06Q 20/065 |
| 2003/0182553 A1 | 9/2003 | Medvinsky | |
| 2004/0032879 A1 | 2/2004 | Keller-Tuberg et al. | |
| 2007/0005962 A1 * | 1/2007 | Baker .................... | G06Q 20/02 |
| | | | 713/168 |
| 2007/0157031 A1 * | 7/2007 | Sudhakar ................ | H04L 9/083 |
| | | | 713/189 |
| 2009/0141891 A1 | 6/2009 | Boyen et al. | |
| 2009/0327146 A1 | 12/2009 | Johnson | |
| 2010/0211782 A1 | 8/2010 | Kuradkar et al. | |
| 2011/0211700 A1 | 9/2011 | Park et al. | |
| 2012/0204032 A1 | 8/2012 | Wilkins et al. | |
| 2013/0101120 A1 * | 4/2013 | Brique .................. | G06F 21/445 |
| | | | 380/268 |
| 2013/0191631 A1 | 7/2013 | Ylonen et al. | |
| 2015/0195254 A1 | 7/2015 | Stiglic et al. | |
| 2016/0080151 A1 | 3/2016 | Smets et al. | |
| 2016/0292672 A1 * | 10/2016 | Fay ...................... | G06Q 20/363 |
| 2016/0323109 A1 * | 11/2016 | McCoy ................ | G06Q 50/184 |
| 2016/0328713 A1 | 11/2016 | Ebrahimi | |
| 2016/0342984 A1 | 11/2016 | Thomas et al. | |
| 2017/0041296 A1 † | 2/2017 | Ford et al. | |
| 2017/0053249 A1 | 2/2017 | Tunnell et al. | |
| 2017/0171174 A1 | 6/2017 | Campagna | |
| 2017/0171219 A1 | 6/2017 | Campagna | |
| 2017/0187535 A1 | 6/2017 | Middleton et al. | |
| 2017/0243287 A1 | 8/2017 | Johnsrud et al. | |
| 2017/0250815 A1 | 8/2017 | Cuende et al. | |
| 2018/0025166 A1 | 1/2018 | Daniel et al. | |
| 2018/0075532 A1 | 3/2018 | Chenard et al. | |
| 2018/0183600 A1 | 6/2018 | Davis | |
| 2018/0205555 A1 | 7/2018 | Watanabe et al. | |
| 2018/0227300 A1 | 8/2018 | Nakic et al. | |
| 2018/0343114 A1 | 11/2018 | Ben-Ari | |
| 2019/0066065 A1 | 2/2019 | Wright et al. | |
| 2019/0095909 A1 | 3/2019 | Wright et al. | |
| 2019/0213341 A1 | 7/2019 | Li | |
| 2019/0303887 A1 | 10/2019 | Wright et al. | |

FOREIGN PATENT DOCUMENTS

| | | |
|---|---|---|
| CN | 106022917 | 10/2016 |
| CN | 106375097 | 2/2017 |
| JP | 113387 | 1/1999 |
| JP | 200592709 | 4/2005 |
| RU | 2505855 | 1/2014 |
| TW | 200635317 | 10/2006 |
| WO | WO 03088054 | 10/2003 |
| WO | WO 2012172681 | 12/2012 |
| WO | WO 2016015041 | 1/2016 |
| WO | WO 2017010455 | 1/2017 |
| WO | WO 2017027438 | 2/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Second Written Opinion in International Application No. PCT/US2018/019464, dated Jan. 22, 2019, 8 pages.
International Search Report and Written Opinion in International Application No. PCT/US2018/019464, dated Apr. 26, 2018, 14 pages.
Menezes et al., "Handbook of Applied Cryptography—Chapter 13—Key Management Techniques," CRC Press, 1996, pp. 543-590.
Yuan et al., "Blockchain: The State of the Art and Future Trends," ACTA Automatica Sinica, Apr. 2016, 42(4):481-494 (with English abstract).

\* cited by examiner
† cited by third party

```
┌─────────────────────────────────────────────────────────────────────┐
│ Write, by a data exchange platform, a data exchange agreement       │
│ between a first user and a second user into a block chain, the      │
│ data exchange agreement associated with first data                  │
│                              510                                    │
└─────────────────────────────────────────────────────────────────────┘
                                  │
                                  ▼
┌─────────────────────────────────────────────────────────────────────┐
│ Receive, by the data exchange platform and from a first device      │
│ associated with the first user, a first key, the first key used     │
│ for decrypting encrypted first data                                 │
│                              520                                    │
└─────────────────────────────────────────────────────────────────────┘
                                  │
                                  ▼
┌─────────────────────────────────────────────────────────────────────┐
│ Transmit, by the data exchange platform and to a second device      │
│ associated with the second user, the received first key             │
│                              530                                    │
└─────────────────────────────────────────────────────────────────────┘
                                  │
                                  ▼
┌─────────────────────────────────────────────────────────────────────┐
│ Transmit, by the first device and to the second device, the         │
│ encrypted first data without passing through the data exchange      │
│ platform                                                            │
│                              540                                    │
└─────────────────────────────────────────────────────────────────────┘
                                  │
                                  ▼
┌─────────────────────────────────────────────────────────────────────┐
│ Decrypt, by the second device, the encrypted first data based on    │
│ the first key to obtain the first data                              │
│                              550                                    │
└─────────────────────────────────────────────────────────────────────┘
```

SECURE DATA TRANSACTIONS

CROSS REFERENCE TO RELATED APPLICATIONS

This application claims priority to Chinese Application No. 201710102824.3, filed on Feb. 24, 2017, which is incorporated by reference is its entirety.

BACKGROUND

Data owned by a user has certain value. Normally, when the user performs a data transaction (such as, exchanging data with another user to obtain each desired data), the exchanged data are transmitted through a data exchange platform.

SUMMARY

The present disclosure describes secure data transactions.

In an implementation, a data exchange agreement between a first user and a second user is written, by a data exchange platform, into a block chain. The data exchange agreement is associated with first data. A first key is received, by the data exchange platform and from a first device associated with the first user. The first key is used for decrypting encrypted first data. The received first key is transmitted by the data exchange platform to a second device associated with the second user.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach can be used to enable data transactions. For example, in a data exchange process, a data exchange platform writes a data exchange agreement between a first user and a second user into a block chain, and stores the data exchange agreement. The data exchange platform then receives a first key from a first device associated with the first user. The first key is used for decrypting encrypted first data. The first device transmits the encrypted first data to a second device associated with the second user. The data exchange platform transmits the first key to the second device, and the second device decrypts the encrypted first data based on the first key to obtain the first data. Second, the described approach can provide secure data transactions. The data exchange platform keeps clear of the exchanged first data in the data exchange process. As a result, the described approach can avoid the risk that the first data can be used by the data exchange platform for other purposes, and enhance the data security in the data exchange process. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 5 is a flowchart illustrating another example of a computer-implemented method for secure data transactions, according to an implementation of the present disclosure.

Like reference numbers and designations in the various drawings indicate like elements.

DETAILED DESCRIPTION

Figure 1:
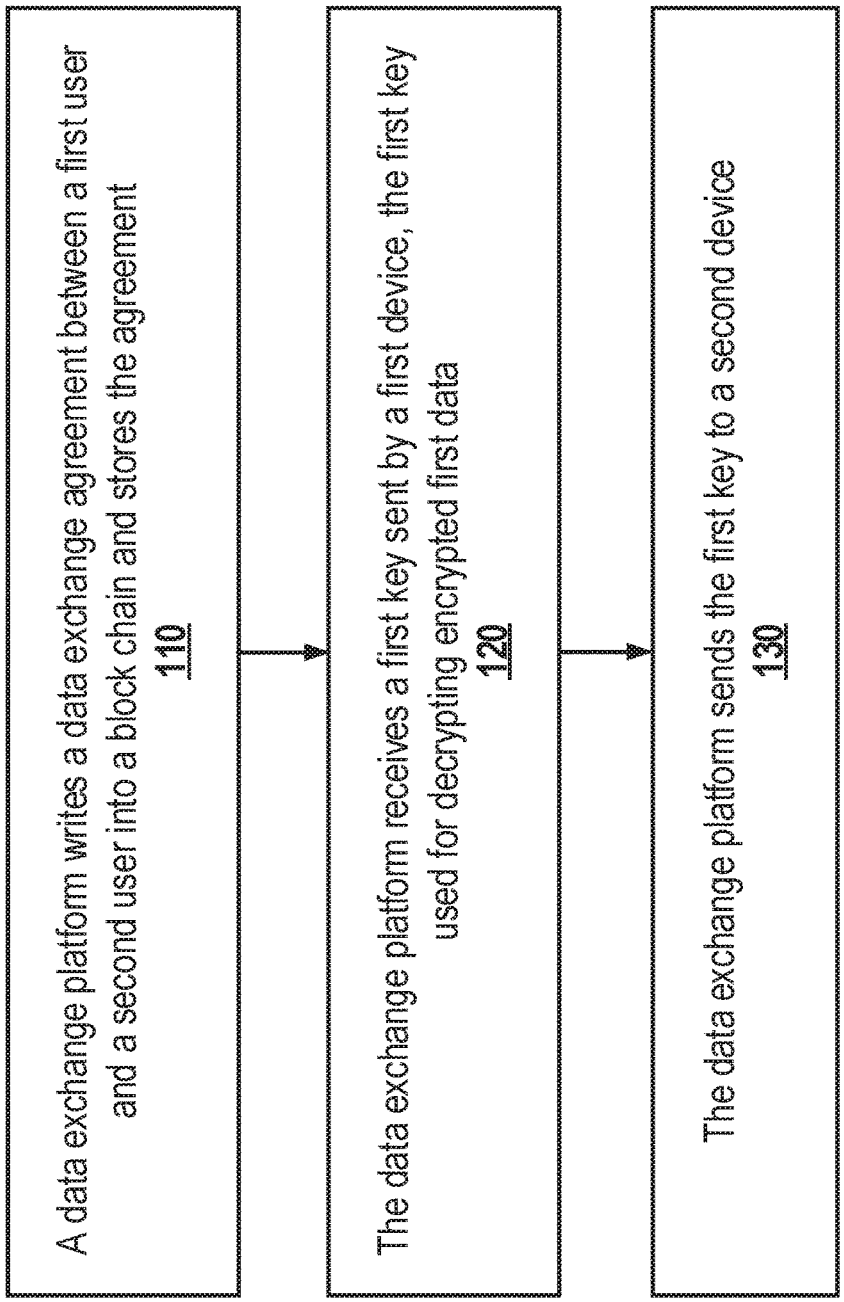
FIG. 1 is a flowchart illustrating an example of a computer-implemented method for secure data transactions, according to an implementation of the present disclosure.

The following detailed description describes secure data transactions, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

The development of information technology has brought great convenience to people's work and life. In the field of information technology, information is stored and transmitted by using data as a carrier, and data can be stored in a binary form in a storage medium of a computing device. In some implementations, the data can be text, symbolic, video, audio, or in any other form that can be identified by the computing device.

Data, as a carrier of information, usually has certain value. Especially in an age of big data, big data has great value for the government and enterprises to carry out various types of work or activities. Information extracted from the big data can help the government and enterprises to make better decisions. For example, large social networking sites usually accumulate a large amount of user data, which not only records personal identity information of users, but also reflects the users' personal hobbies, living habits, personal relationships, and other user-associated information. The information contained in the accumulated user data has great value for carrying out subsequent business development, such as, helping marketing companies to push advertisements precisely to users.

Data holders can exchange data with each other to obtain each desired data in order to make full use of data owned by each. To make it convenient for data consumers to find useful data for themselves, both parties of a data exchange process can exchange data through a data exchange platform.

However, because data is replicable, the ownership of data is not as clear as that of a real object. When a real object is transferred from party A to party B, party A loses the ownership of the real object. When data is transferred from one party to another passing through a third party in a data transfer process, the third party can copy the data, thereby owning the data. This can damage the interests of both other parties in the data exchange process.

The data exchange platform can play not only a role of matching two parties of a data exchange process, but also a role of a guarantor, that is, guaranteeing the interests of both parties in the data exchange process. In order to prevent the situation that, after one party of a data exchange process sends its data to the other party, the other party does not send its own data to the one party, the data exchange platform can first acquire the exchanged data from both parties of the data exchange process, and then separately send data to both parties of the data exchange process. In doing so, the data exchange platform can prevent either party from reneging on a promise. Thus, it is possible that the data exchange platform itself can use the exchanged data for other purposes, thereby causing damages to the interests of both parties in the data exchange process, and decreasing data security of the data exchange process. To solve this problem, the instant disclosure describes a secure data transaction method. The data transaction method provided in the instant disclosure can be executed by a data exchange platform, and the data exchange platform can be software, hardware, or a combination of both for implementing this method.

Hereinafter, the technical solution provided in each implementation of the instant disclosure is described in detail with reference to the accompanying drawings.

Implementation 1

In order to solve the low data security problem in the existing data exchange process, Implementation 1 of the instant disclosure describes a data transaction method. In this implementation of the instant disclosure, for ease of description, both parties of a data exchange are referred to as a first user and a second user. The first user and the second user may be any organization or individual. The first user and the second user herein are used for distinguishing both parties of a data transaction, and should not be understood as a limitation to both parties of the data transaction in the instant disclosure.

Both parties can execute some operations of a data exchange process by using user devices. For ease of description, a user device corresponding to one or more operations executed by the first user is referred to as a first device, and a user device corresponding to one or more operations executed by the second user is referred to as a second device. It should be noted that, in particular data exchange processes, a same user can use a single device or different devices. That is, the first device and the second device mentioned in each process in an implementation of the instant disclosure can be different devices. The device can be, for example, a personal computer, a server, a mobile terminal, or other computing device, the type of which is not limited in the instant disclosure.

In a data exchange process, both parties of the data exchange process usually concur to a data exchange agreement before exchanging data. The data exchange agreement refers to an agreement on details of the data exchange process between both parties of the data exchange process before data is exchanged. The data exchange agreement includes provisions stipulated by both parties of the data exchange process in order to determine their respective rights and obligations, and the provisions are abided by both parties.

To reach a data exchange agreement, a first user, through a first device, can publish data information on a data exchange platform. After receiving the data information from the first device, the data exchange platform can then publish the data information. Thus, a second user, who is interested in the data information, can place an order for the data information on the data exchange platform through a second device, after discovering the data information on the data exchange platform. The data exchange platform receives the order for the published data information from the second device, and sends the order to the first device. After the first device confirms the order, the data exchange platform receives confirmation information for the order sent by the first device, thereby achieving the data exchange agreement.

The previous description briefly describes a process of achieving an agreement. In real applications, both parties of a data exchange process can decide details of the agreement through multiple negotiations. The data exchange agreement can include identity information of both parties of the data exchange process, characteristic information of the exchanged data, data usage specifications abided by both parties, and punishment, abided by both parties, for violating the agreement, and other information. In this way, after receiving data, a receiver can take corresponding measures, based on the agreement, if the received data does not conform to the description in the agreement.

In the agreement, the characteristic information of the exchanged data can include at least one of the following: a message digest for verifying integrity of the data, and baseline information for summarizing specific content of the data. For first data, the characteristic information of the first data includes at least one of the following: a message digest for verifying integrity of the first data, and baseline information for summarizing specific content of the first data.

The message digest is a fixed-length value, uniquely corresponding to a message or document, determined based on a one-way hash algorithm. Thus, when the data to be exchanged is modified, the message digest of the data can also change. Commonly used one-way hash algorithms include: a Message Digest Algorithm 5 (MD5), a Secure Hash Algorithm (SHA), a Message Authentication Code (MAC), and so on.

Based on the message digest of the first data contained in the agreement, after receiving the encrypted data, the second user can carry out integrity check on the encrypted data to determine whether the received data has been modified. Meanwhile, an integrity check value can be a reference in future disputes between both parties of the data exchange process.

The baseline information for summarizing specific content of the first data can be, for example, the type of data that should be included in the first data, or some specific conditions that the data in the first data should satisfy, or effects that can be achieved when applying the data in the first data, and so on. Based on the information, the second device can verify the specific content of the first data, thus preventing the second user from being deceived, and avoiding losses to its own interests.

The disclosure describes a process of achieving a data exchange agreement by both parties of a data exchange process before sending data. A process of sending data by both parties of the data exchange process in the instant disclosure, that is, a secure data transaction method is also described in the instant disclosure. A schematic flowchart for implementing the secure data transaction method is shown in FIG. 1.

FIG. 1 is a flowchart illustrating an example of a computer-implemented method 100 for secure data transactions. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 110, a data exchange platform uses block chain technology and writes a data exchange agreement between a first user and a second user into a block chain and stores the agreement. In another implementation, an agreement can be stored in a storage medium of a computing device in the form of data.

Data stored in a storage medium can have a risk of being modified. In order to prevent both parties of a data exchange process from modifying the agreement without authorization, and to enhance the security of the agreement data, the data exchange platform can be used as a third party to save the agreement.

However, if the agreement is saved by the data exchange platform, it is possible that the data exchange platform can modify the agreement. For example, if the data exchange platform colludes with one party of the data exchange process to modify the agreement, the interests of the other party will be damaged. In order to further enhance the security of the agreement data, and to enhance the credibility of the data exchange platform, the previously mentioned block chain technology can be used for storing the data exchange agreement between the first user and the second user.

The block chain technology is a decentralized, detrusted, tamper-proof, distributed data storage technology. A data structure stored by using the block chain technology is a chained data structure. Data in the chained data structure can be changed only in an incremental manner. Data already recorded will keep the initial state, and will not be covered (for example, re-written).

Meanwhile, the block chain follows a consensus mechanism when recording data. When a node records data, the recorded data can be recorded in each node of the block chain only after obtaining the consensus of most nodes in the block chain. This greatly reduces the possibility that the stored data is illegal data, thus greatly reducing the possibility of the agreement being tampered with.

The consensus mechanism used in the block chain technology can be, for example, a proof-of-work mechanism, a proof-of-stake mechanism, a delegated proof-of-stake mechanism, a verification pool mechanism, and so on. To modify existing data in the block chain, the only option is to replace the original data by forging a side chain. The tampering costs are huge in terms of technical difficulty, time consumption, and labor use. It is almost impossible to accomplish this under the consensus mechanism of the block chain.

It can be concluded through the previously described analysis that the implementation of the instant disclosure that stores a data exchange agreement by using a block chain technology, can effectively avoid the possibility of the agreement being tampered with, and hence greatly enhance the security of the data exchange agreement. From 110, method 100 proceeds to 120.

At 120, the data exchange platform receives a first key sent by a first device. The first key is used for decrypting encrypted first data.

The first data mentioned here is data that the first user expects to send to the second user. Thus, the first user here is a sender of the first data, and the second user is a receiver of the first data. It should be apparent to those of ordinary skill in the art that sending of data between users, in actual operation, can be by a user using a device to send data to a device of another user.

In order to prevent data from being stolen by a third party, the first data can be encrypted, and then sent to the second device. In cryptography, encryption is used to hide real information, so that the real information is not readable without a decryption key, thereby enhancing the security in data transmission.

Even if the data is encrypted before transmitted through the data exchange platform, it is still possible that the data exchange platform can use the encrypted first data for other purposes. For example, the data can be cracked by the data exchange platform. Alternatively, the encrypted first data can be sent by the first device directly to the second device, and the data exchange platform keeps clear of the exchanged data. In doing so, the security in data transmission can be further enhanced.

The data can be encrypted by the first device using a variety of encryption methods. For example, the first data can be encrypted by using a symmetric encryption algorithm. In this case, the first key here is a key used to encrypt the first data. In this way, the data exchange platform determines a key for decrypting the encrypted first data based on receiving the key that is sent by the first device and used for encrypting the first data. Or, the first device can also encrypt the first data by using an asymmetric encryption algorithm, and encrypt the first data with a public key sent by the data exchange platform. In this way, the data exchange platform only needs to determine a private key for decrypting the encrypted data.

In order to restrict both parties of a data exchange process, it is preferred that the first key is sent by the data exchange platform at the right time, instead of being directly sent by the first device to the second device. That is, after the first device encrypts the first data by using a symmetric encryption algorithm, the first key used in the encryption can be sent by the first device to the data exchange platform. After receiving the first key sent by the first device, the data exchange platform can send the first key to the second device. From 120, method 100 proceeds to 130.

At 130, the data exchange platform sends the first key to a second device.

In this way, after receiving the encrypted first data sent by the first device, the second device can decrypt the received encrypted first data based on the first key to obtain the first data. The second device is a device corresponding to the second user.

Similarly, when sending data to the first device, the second device can also encrypt the data by using a key. Here, the to-be-exchanged data held by the second user is referred to as second data. After encrypting the second data, the second device sends the encrypted second data to the first device, and then sends a second key for decrypting the encrypted second data to the data exchange platform. The platform then sends the second key to the first device, such that the first device can decrypt the encrypted second data by using the second key to obtain the second data, thus accomplishing data exchange process between both parties. In this process, the exchanged data between both parties does not pass the data exchange platform, thereby enhancing the security of the exchanged data.

It should be noted that, in the implementation of the instant disclosure, for ease of description, the data held by the first user is referred to as the first data, the data held by the second user is referred to as the second data, and the process of exchanging data by both parties is a process of exchanging the first data and the second data. It can be understood that the terms "first" and "second" used in the implementation of the instant disclosure are used for distinguishing different described objects, and do not refer to particular objects.

In order to further enhance the data security and to prevent damage to the interests of either party, after receiving the keys sent by both parties (for example, the first key sent by the first device, and the second key sent by the second device), the data exchange platform can send the keys to both parties (for example, the first key to the second device, and the second key to the first device) after receiving confirmation information sent by both parties for the first and second data. In doing so, it can prevent the case that one party does not send the key after receiving its desired data, which greatly harms the interests of the other party. For example, after sending the first key to the second device, the data exchange platform sends the second key to the first device after receiving the confirmation information sent by the second device for the first data. The confirmation information for the first data indicates that the second user determines that the first data conforms to the description in the agreement, thus effectively protecting the interests of the second user. Similarly, after receiving the confirmation information sent by the second user for the first data, the data exchange platform can also receive confirmation information sent by the first device for the second data. The confirmation information for the second data indicates that the first user determines that the second data conforms to the description in the agreement.

Different types of data can be exchanged through a platform. The data can be, for example, data that the user does not care whether it is obtained by a third party, or data from which value cannot be acquired through replication. These types of data do not need to be encrypted, thus saving computing resources and storage resources. For ease of description, data that can be exchanged through a platform is referred to as third data.

Hereinafter, a data exchange method provided in the instant disclosure is illustrated in detail by using an example in which to-be-exchanged data of the second user is the third data that can be exchanged through the data exchange platform, and the technology for encrypting the first data to be exchanged is a symmetric encryption technology. The method includes the following steps:

Step 1: A data exchange platform writes a data exchange agreement between a first user and a second user into a block chain and stores the agreement.

Step 2: The data exchange platform receives a first key sent by a first device. The first key is used for decrypting encrypted first data.

Step 3: The first device sends the encrypted first data to a second device.

Step 4: The second device sends third data to the data exchange platform.

It should be noted that the instant disclosure does not limit the executing order of step 2, step 3, and step 4.

Step 5: The data exchange platform sends the received first key to the second device.

Because the second user sends the third data to the data exchange platform directly, the data exchange platform can verify the third data. If it is determined that the third data does not conform to the agreement achieved by both parties, the data exchange platform will not send the first key to the second device, thereby avoiding damage to the interests of the first user. Therefore, a specific implementation process of this step can be: sending the received first key to the second device if the data exchange platform determines that the third data conforms to the agreement of both parties.

Step 6: The second device decrypts the received encrypted first data according to the received first key to obtain the first data.

Step 7: The data exchange platform sends the third data to the first device.

For the second user obtaining the first data, the platform cannot verify the authenticity of the first data since the platform keeps clear of the first data. In this case, the first data is verified by the second device. During the verification process, the second device can acquire characteristic information associated with the first data agreed on by both parties in the agreement. Specifically, the characteristic information can be acquired from the agreement stored in a block chain. In some implementations, the second device stores the agreement locally when negotiating the agreement. Therefore, the second device can also acquire the characteristic information from the agreement stored locally. After acquiring the characteristic information associated with the first data in the agreement, the second device can verify whether the acquired first data conforms to the agreement according to the acquired characteristic information.

In this way, if the second user determines that the first data does not conform to the original agreement, the platform cannot send the third data to the first device, thereby avoiding damage to the interests of the second user.

Thus, the third data can be sent to the first device when a data sending instruction sent by the second device is received. The data sending instruction here is an instruction that instructs the data exchange platform to send the third data to the first user. For example, the instruction can be the aforementioned confirmation information for the first data. Thus, the third data is sent to the first device only after the second user determines that the first data conforms to the description in the agreement.

However, if the second user does not send a data sending instruction to the platform, the first user will not receive the third data. In order to avoid damage to the interests of the first user, in some cases, the third data can be sent to the first user without a data sending instruction. For example, if the first user did not send confirmation information for the first data after a preset duration since the first key is sent to the second user, the third data can be sent to first user.

Based on the previous description, a specific implementation process of step 7 can be: sending the third data to the first user when a preset condition is met. Here, when a preset condition is met can be after the data sending instruction sent by the second device is received, or after a preset duration, since the key is sent to the second device.

At this point, the exchange of the first data and the third data between users is accomplished. This method can prevent the situation that one party does not send data to the other party after acquiring the data sent by the other party, thereby protecting the interests of both parties of a data exchange process.

After the completion of the data exchange process, the data exchange platform can write completion information of the data exchange into a result of the data change agreement in the block chain, and store the completion information of the data exchange process for subsequent use.

In the implementation of the instant disclosure, a transmission state of the encrypted data can be determined. The transmission state of the encrypted data can prevent the situation that the second user receives the encrypted data but claims that the encrypted data is not received. In addition, the transmission state of the encrypted data can prevent the situation that the first device does not send data to the second device but the first user claims to have the data sent to the second device. The encrypted data here is the encrypted exchanged data, for example, the aforementioned encrypted first data and encrypted second data. The transmission state includes at least one of the following: the encrypted data has not been transmitted, the encrypted data is being transmitted, and the encrypted data has been transmitted to the second device.

A specific way to determine the transmission state of the encrypted data can be the data exchange platform acquires the transmission state of the encrypted data through a predetermined monitoring program. The monitoring program can be a program used for transmitting data between both parties of a data exchange process. Or, a specific way to determine the transmission state of the encrypted data can be receiving the transmission sate of the encrypted data proactively reported by the first device and the second device.

The encrypted data sent by the first device does not pass the data exchange platform. Therefore, if the first device needs to perform data exchange with multiple different devices, the first device needs to develop different data transmission interfaces for the different devices because different devices can support different data transmission modes. This will not only consume a lot of human resources, but also occupy an excessive number of storage resources. The data transmission platform can draft a data transmission specification, and define a standard transmission interface for a data transmission. The standard transmission interface is a universal interface used during the data transmission between devices.

As long as a device of a user performing data exchange through the data transmission platform implements the standard transmission interface, the device can transmit data to any device that implements the standard transmission interface. In the standard transmission interface defined by the data transmission platform, information, such as a data transmission protocol during data transmission between both parties of a data exchange process, can be defined. Details are not described here.

The functions of the defined standard interface can include a function of sending a data transmission state to the data exchange platform. In this way, after sending the encrypted data, the data exchange platform can determine that the encrypted data has been successfully sent to the second device, and then perform a corresponding operation. After 130, method 100 stops.

Figure 2:
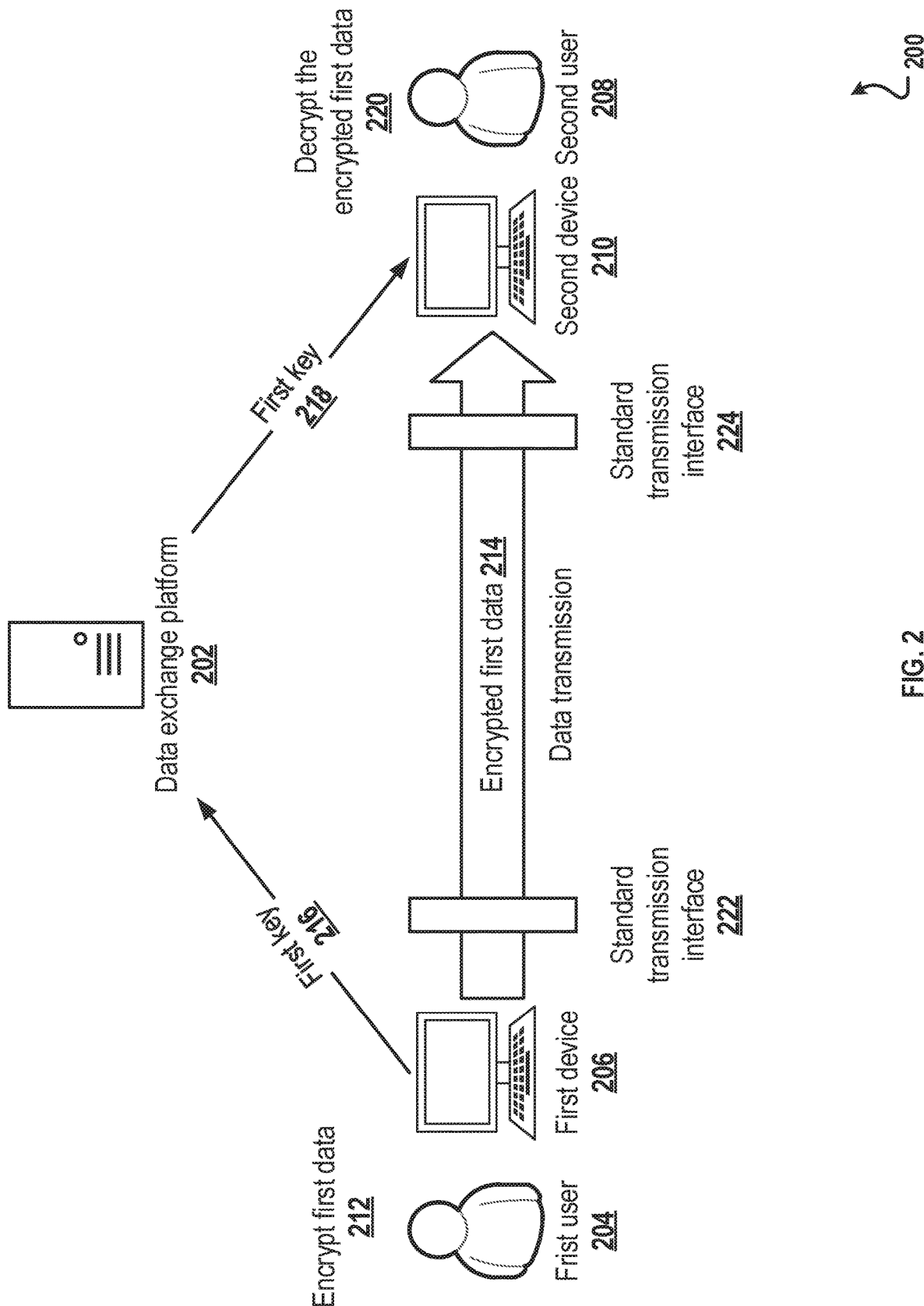
FIG. 2 is a block diagram illustrating an example of a networking environment for secure data transactions, according to an implementation of the present disclosure.

FIG. 2 is a block diagram illustrating an example of a networking environment 200 for secure data transactions, according to an implementation of the present disclosure. For clarity of presentation, the description that follows generally describes environment 200 in the context of the other figures in this description. Environment 200 can include a data exchange platform 202, a first user 204, a first device 206 associated with the first user 204, a second user 208, and a second device 210 associated with the second user 208. In some implementations, environment 200 can include additional or different (or a combination of both) components not shown in the block diagram. In some implementations, components can also be omitted from environment 200.

At 212, the first device 206 encrypts first data to obtain encrypted first data.

At 214, the first device 206 sends the encrypted first data to the second device 210 through an implemented standard transmission interface 222.

The second device 210 also implements a standard transmission interface 224.

At 216, the first device 206 sends first key to a data exchange platform 202.

At 218, the data exchange platform 202 sends the received first key to the second device 210.

At 220, the second device 210 decrypts the encrypted first data according to the received first key to obtain the first data.

In the data sending method provided in Implementation 1 of the instant disclosure, in a data exchange process, a data exchange platform writes a data exchange agreement between a first user and a second user into a block chain. The data exchange platform then receives a first key, sent by a first device associated with the first user, for decrypting encrypted first data. The first device sends the encrypted first data to a second device associated with the second user. The data exchange platform sends the first key to the second device, and the second device decrypts the received encrypted first data based on the first key to obtain the first data. It is apparent that the data exchange platform keeps clear of the exchanged first data in the data exchange process, thereby avoiding the risk that the first data can be used by the data exchange platform for other purposes, and enhancing the data security in the data exchange process.

It should be noted that, for ease of description, an implementation of the data sending method is introduced by using an example in which the data method is executed by the data exchange platform. It can be understood that the method executed by the data exchange platform is an example illustration, and should not be understood as a limitation on this method. Next, the steps of the method provided in Implementation 1 can be executed by a same device, or by different devices.

Implementation 2

The concept of the instant disclosure is described based on the previously described Implementation 1 in detail. For better understanding of the technical features, means, and effects of the instant disclosure, the data sending method of the instant disclosure is further illustrated in the following, thereby forming another implementation of the instant disclosure.

The data exchange process in Implementation 2 of the instant disclosure is similar to the data exchange process in Implementation 1. For some steps that are not introduced in Implementation 2, reference may be made to the relevant description in Implementation 1. Details are not described herein.

Before describing the implementation of the solution in detail, an implementation scenario of the solution is briefly introduced.

On the Internet, money is also present in the form of data. Therefore, a value of data representing money can be the value of the money represented by the data. On the Internet, transferring of data representing money is usually implemented, in an actual operation, by changing numerical values identifying the money. For example, if 100 yuan is transferred from account A to account B, the transferring of data is actually changing the numerical values representing money in account A and account B.

As described in Implementation 1, data values of some types of data cannot be acquired through replication, and such types of data can be transmitted through a platform. Thus, in Implementation 2, a specific implementation process of the data sending method provided in the instant disclosure is illustrated in detail by using an example in which the third data is data representing money. For ease of description, the third data representing money is referred to as money for short in the following. Thus, the data exchange process can be understood as a data transaction process, the first user in Implementation 1 is a data seller, the second user is a data buyer, and the data exchange platform is a data transaction platform that can provide a data transaction service for users.

Figure 3:
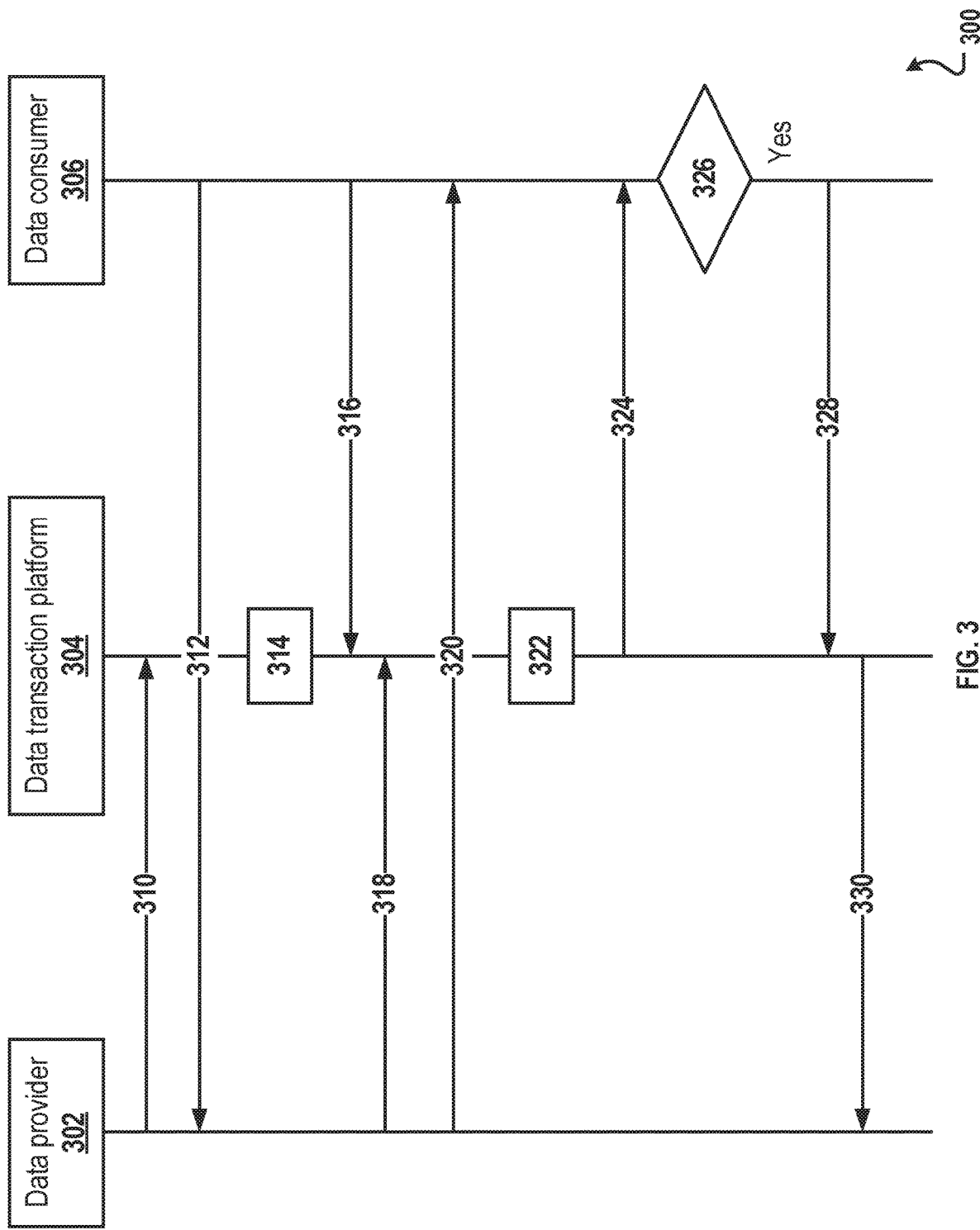
FIG. 3 is a swim diagram illustrating an example of a computer-implemented method for secure data transactions, according to an implementation of the present disclosure.

Based on the previously described scenario, the process of implementing data transaction in Implementation 2 is shown in FIG. 3.

FIG. 3 is a swim diagram illustrating an example of a computer-implemented method 300 for secure data transactions, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 310, a data provider 302 (that is, a data seller) publishes information of data for sale on a data transaction platform 304.

The data transaction platform 304 can support users having data to sell to publish information of data for sale, such that other users (for example, data buyers) can find their desired information on the data transaction platform 304.

At 312, a data consumer 306 (that is, a data buyer) and the data provider 302 concur to a data transaction agreement.

The data consumer 306 can communicate with the data provider 302 on specific transaction details, and finally reach a data transaction agreement. The function of the data transaction agreement is similar to the function of the data exchange agreement described in Implementation 1, and thus is not described in detail again here.

At 314, the data transaction platform 304 writes the data transaction agreement reached by both parties into a block chain.

Once the data transaction agreement is written into the block chain, the possibility of tampering with the agreement can be greatly reduced, and security of the agreement is enhanced.

At 316, the data consumer 306 pays an amount of money defined in the agreement to the data transaction platform 304.

On the Internet, the transfer of money is actually the transfer of data representing the money. In an actual operation, this is usually accomplished by changing values of data identifying money in accounts.

At 318, the data provider 302 encrypts the data for sale to obtain encrypted data, and then sends a key for the encryption to the data transaction platform 304.

The data can be encrypted by using a symmetric encryption technology, such that the key for encryption is the same as the key for decryption.

It should be noted that the implementation of the instant disclosure does not limit the executing order of step 316 and step 318.

At 320, the data provider 302 transmits the encrypted data to a device of the data consumer 306 through a device that implements a standard transmission interface.

As described in Implementation 1, the standard transmission interface here is a universal interface defined by the data exchange platform, and used during data transmission between devices. The device of the data consumer 306 also implements the standard transmission interface, in order to receive data. In this way, when the data consumer 306 and the data provider 302 further perform data exchange with other users of the data transaction platform 304, there is no need to develop other transmission interfaces, thereby saving human resources and storage resources.

At 322, the data transaction platform 304 determines that the encrypted data has been transmitted to the device of the data consumer 306.

A specific method for determining that the encrypted data has been transmitted to the device of the data consumer 306 is similar to the relevant description in Implementation 1, and thus is not described in detail again here.

At 324, the data transaction platform 304 determines that the amount of money paid by the data consumer 306 conforms to the amount defined in the agreement. In response to the determination, the data transaction platform 304 sends the key to the data consumer 306.

It should be noted that the implementation of the instant disclosure does not limit the executing order of step 322 and step 324.

At 326, the data consumer 306 decrypts the encrypted data by using the received key, and verifies whether the decrypted data conforms to the description in the agreement.

At 328, the data consumer 306 determines that the received data conforms to the description in the agreement. In response to the determination, the data consumer 306 sends a receipt confirmation instruction to the data transaction platform 304 through the device of the data consumer 306.

The function of the receipt confirmation instruction is similar to the function of the second data sending instruction described in Implementation 1, and thus is not described in detail again here.

At 330, the data transaction platform 304, after receiving the receipt confirmation instruction, transfers the amount of money paid by the data consumer 306 to an account of the data provider 302.

If the data provider 302 and data consumer 306 subsequently have disputes over the trade data, they can protect their rights according to the agreement in the block chain.

In the data transaction method provided in Implementation 2 of the instant disclosure, a data transaction platform receives a key, sent by a data seller and used for encrypting data for sale, and sends the key to a device of a data buyer after receiving money paid by the data buyer through the device of the data buyer. In this way, after receiving encrypted data sent by the data seller, the data buyer can decrypt the encrypted data by using the key to obtain the data sold by the data seller. Thus, in the data transaction process, the data exchange platform keeps clear of the sold data, thereby avoiding the risk that the sold data can be used by the data exchange platform for other purposes, and enhancing data security in the data transaction process.

Implementation 3

In order to solve the low data security problem in the existing data exchange process, Implementation 3 of the instant disclosure describes a data sending apparatus. A schematic structural diagram of the data sending apparatus is shown in FIG. 4.

Figure 4:
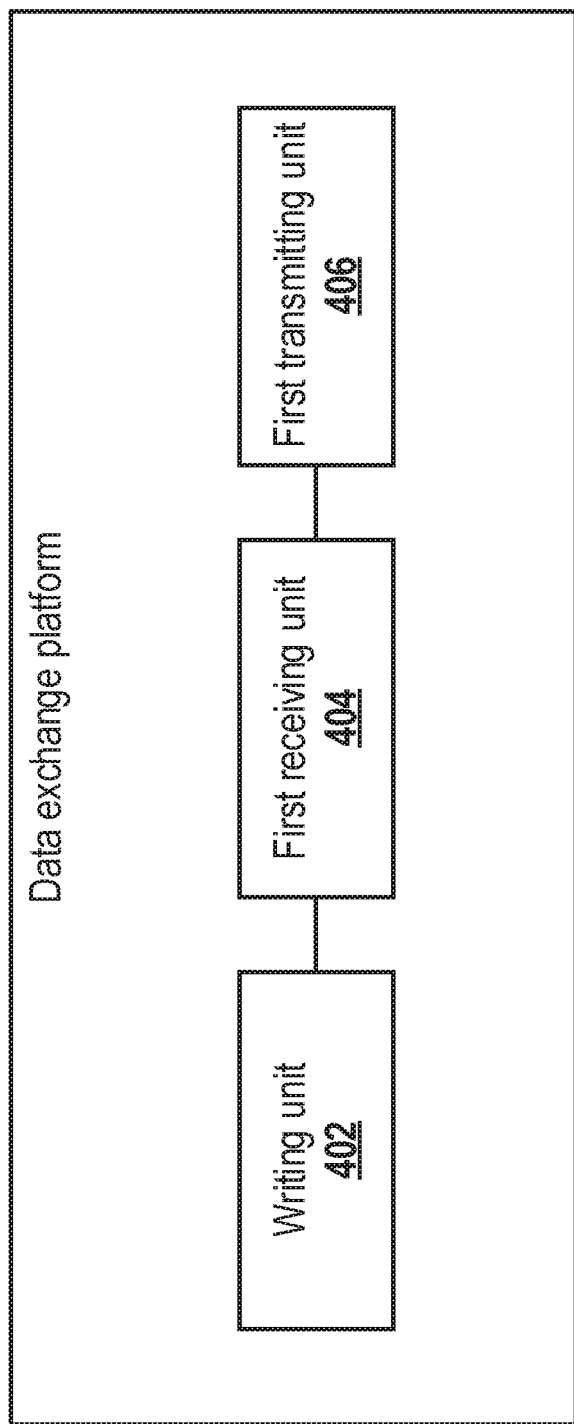
FIG. 4 is a block diagram illustrating an example of a data exchange platform, according to an implementation of the present disclosure.

FIG. 4 is a block diagram illustrating an example of a data exchange platform 400, according to an implementation of the present disclosure. For clarity of presentation, the description that follows generally describes platform 400 in the context of the other figures in this description. The platform 400 can include a writing unit 402, a first receiving unit 404, and a first transmitting unit 416, which can be implemented in hardware, software, or both. In some implementations, the platform 400 can include additional or different (or a combination of both) components not shown in the block diagram. In some implementations, components can also be omitted from the platform 400.

The writing unit 402 can, for example, be configured to write a data exchange agreement between a first user and a second user into a block chain and store the agreement.

The first receiving unit 404 can, for example, be configured to receive a first key sent by a first device. The first key is used for decrypting encrypted first data, and the first device is a device corresponding to a first user.

The first transmitting unit 406 can, for example, be configured to send the first key to a second device, such that the second device, after receiving the encrypted first data sent by the first device, decrypts the received encrypted first data based on the first key to obtain the first data. The second device is a device corresponding to the second user.

In the implementation of the instant disclosure, there are many other specific implementations for exchanging data. In an implementation, the apparatus further includes a third receiving unit and a third transmitting unit. The third receiving unit can, for example, be configured to, before the first transmitting unit 406 sends the first key to the second device, receive a second key sent by the second device. The second key is used for decrypting encrypted second data. The third transmitting unit can, for example, be configured to send the second key to the first device after the first transmitting unit 406 sends the first key to the second device, such that the first device, after receiving the encrypted second data sent by the second device, decrypts the received encrypted second data based on the second key to obtain the second data.

In order to protect the interests of the second user, in an implementation, the apparatus further includes a fourth receiving unit configured to, after the first transmitting unit 406 sends the first key to the second device and before the third transmitting unit sends the second key to the first device, receive confirmation information for the first data sent by the second device. The confirmation information for the first data indicates that the second user determines that the first data conforms to the description in the agreement.

In an implementation, the apparatus further includes a fifth receiving unit configured to, after the fourth receiving unit receives the confirmation information for the first data sent by the second device, receive confirmation information for the second data sent by the first device. The confirmation information for the second data indicates that the first user determines that the second data conforms to the description in the agreement.

In an implementation, the apparatus further includes a second writing unit configured to, after the fifth receiving unit receives the confirmation information for the second data sent by the first device, write completion information of the data exchange into a result of the data exchange agreement in the block chain, and store the completion information of the data exchange process.

In order to protect the interests of both parties in a data exchange process, in an implementation, the apparatus further includes a second receiving unit and a second transmitting unit. The second receiving unit can, for example, be configured to, before the first transmitting unit 406 sends the first key to the second device, receive third data sent by the second device. The second transmitting unit can, for example, be configured to, after the first transmitting unit 406 sends the first key to the second device, send the third data to the first user when a preset condition is met.

In an implementation, that a preset condition is met includes receiving, by the data exchange platform, a data sending instruction sent by the second device. The data sending instruction is an instruction that instructs the data exchange platform to send the third data to the first device.

In an implementation, the data exchange agreement includes characteristic information of the first data.

The characteristic information of the first data includes at least one of the following: a message digest for verifying integrity of the first data, and baseline information for summarizing specific content of the first data.

In order to avoid consuming a lot of human resources in interface development, in an implementation, the encrypted first data is transmitted to the second device through a standard transmission interface of the first device. The standard transmission interface is a universal interface defined by the data exchange platform and used during data transmission between devices.

In the data sending apparatus provided in Implementation 3 of the instant disclosure, in a data exchange process, a data exchange platform writes a data exchange agreement between a first user and a second user into a block chain. The data exchange platform then receives a first key, sent by a first device associated with the first user, for decrypting encrypted first data. The first device sends the encrypted first data to a second device associated with the second user. The data exchange platform sends the first key to the second device, and the second device decrypts the received encrypted first data based on the first key to obtain the first data. It is apparent that the data exchange platform keeps clear of the exchanged first data in the data exchange process, thereby avoiding the risk that the first data can be used by the data exchange platform for other purposes, and enhancing the data security in the data exchange process.

FIG. 5 is a flowchart illustrating another example of a computer-implemented method 500 for secure data transactions. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order. In some implementations, the method 500 can include additional or different (or a combination of both) steps not shown in the flowchart. In some implementations, steps can also be omitted from the method 500.

At 510, a data exchange agreement between a first user and a second user is written, by a data exchange platform, into a block chain. The data exchange agreement is associated with first data. For example, the first data is the data to be transferred from the first user to the second user according to the data exchange agreement. In some implementations, the data exchange platform stores the data exchange agreement. The data exchange agreement includes one or more of identity information of the first and second users, characteristic information of the exchanged data, data usage specifications abided by the first and second users, and punishment, abided by the first and second users, for violating the agreement, and other information associated with the exchanged data.

In some implementations, before writing the data exchange agreement into the block chain, data information associated with the first data is received, by the data exchange platform and from a first device associated with the first user, for publishing on the data exchange platform. The data information associated with the first data is then published by the data exchange platform. An order associated with the first data is received by the data exchange platform and from a second device associated with the second user. The order associated with the first data is transmitted by the data exchange platform to the first device. Confirmation information for the order associated with the first data is received by the data exchange platform and from the first device. Both the order and the confirmation information are associated with the data exchange agreement. In some implementations, the data exchange agreement can be reached using other appropriate methods. From 510, method 500 proceeds to 520.

At 520, a first key is received by the data exchange platform and from a first device associated with the first user. The first key is used for decrypting encrypted first data. For example, the first device encrypts first data to obtain encrypted first data. From 520, method 500 proceeds to 530.

At 530, the received first key is transmitted by the data exchange platform to a second device associated with the second user. In some implementations, before transmitting the received first key, a second key is received by the data exchange platform and from the second device associated with the second user. The second key is used for decrypting encrypted second data, and the second data is associated with the data exchange agreement. For example, the second data is the data to be transferred from the second user to the first user according to the data exchange agreement. After transmitting the received first key, the received second key is transmitted by the data exchange platform to the first device associated with the first user. The first device decrypts the encrypted second data, received from the second device, based on the second key to obtain the second data. From 530, method 500 proceeds to 540.

At 540, the encrypted first data is transmitted by the first device to the second device, without passing through the data exchange platform. In some implementations, instead of passing the encrypted first data through the data exchange platform, the first device transmits the encrypted first data directly to the second device to avoid the data exchange platform using the encrypted first data for other purposes (for example, actions not defined in the data exchange agreement between the first user and the second user), or making unauthorized changes to the encrypted first data before transmitting to the second device. In some implementations, the encrypted first data is transmitted to the second device through a standard transmission interface of the first device. The standard transmission interface is a universal interface defined by the data exchange platform and used for transmitting data between different devices. From 540, method 500 proceeds to 550.

At 550, the encrypted first data is decrypted, by the second device, based on the first key to obtain the first data. In some implementations, after transmitting the received first key and before transmitting the received second key, confirmation information for the first data is received by the data exchange platform and from the second device associated with the second user. The confirmation information for the first data indicates that the second user determines that the obtained first data conforms to the data exchange agreement.

In some implementations, after receiving the confirmation information for the first data, confirmation information for the second data is received by the data exchange platform and from the first device associated with the first user. The confirmation information for the second data indicates that the first user determines that the obtained second data conforms to the data exchange agreement. A record, indicating that data exchange between the first user and the second user is accomplished according to the data exchange agreement, is written by the data exchange platform in the block chain. The record is stored by the data exchange platform.

In some implementations, before transmitting the received first key, third data is received by the data exchange platform and from the second device associated with the second user. The third data is associated with the data exchange agreement. For example, the third data is data that can be exchanged through the data exchange platform. After transmitting the received first key, the received third data is transmitted by the data exchange platform to the first device associated with the first user when a predetermined condition is satisfied. In some implementations, the predetermined condition includes that the data exchange platform receives an instruction from the second device. The instruction is an instruction that instructs the data exchange platform to transmit the received third data to the first device.

In some implementations, the data exchange agreement includes characteristic information of the first data. The characteristic information of the first data is acquired by the second device. The characteristic information of the first data includes at least one of a message digest for verifying integrity of the first data, and baseline information for summarizing specific content of the first data. A determination is made, by the second device, on whether the obtained first data conforms to the data exchange agreement based on the acquired characteristic information of the first data. If it is determined that the obtained first data conforms to the data exchange agreement based on the acquired characteristic information of the first data, the second device transmits confirmation information for the first data to the data exchange platform. If it is determined that the obtained first data does not conform to the data exchange agreement based on the acquired characteristic information of the first data, the second device will not transmit confirmation information for the first data to the data exchange platform. After 550, method 500 stops.

Figure 6:
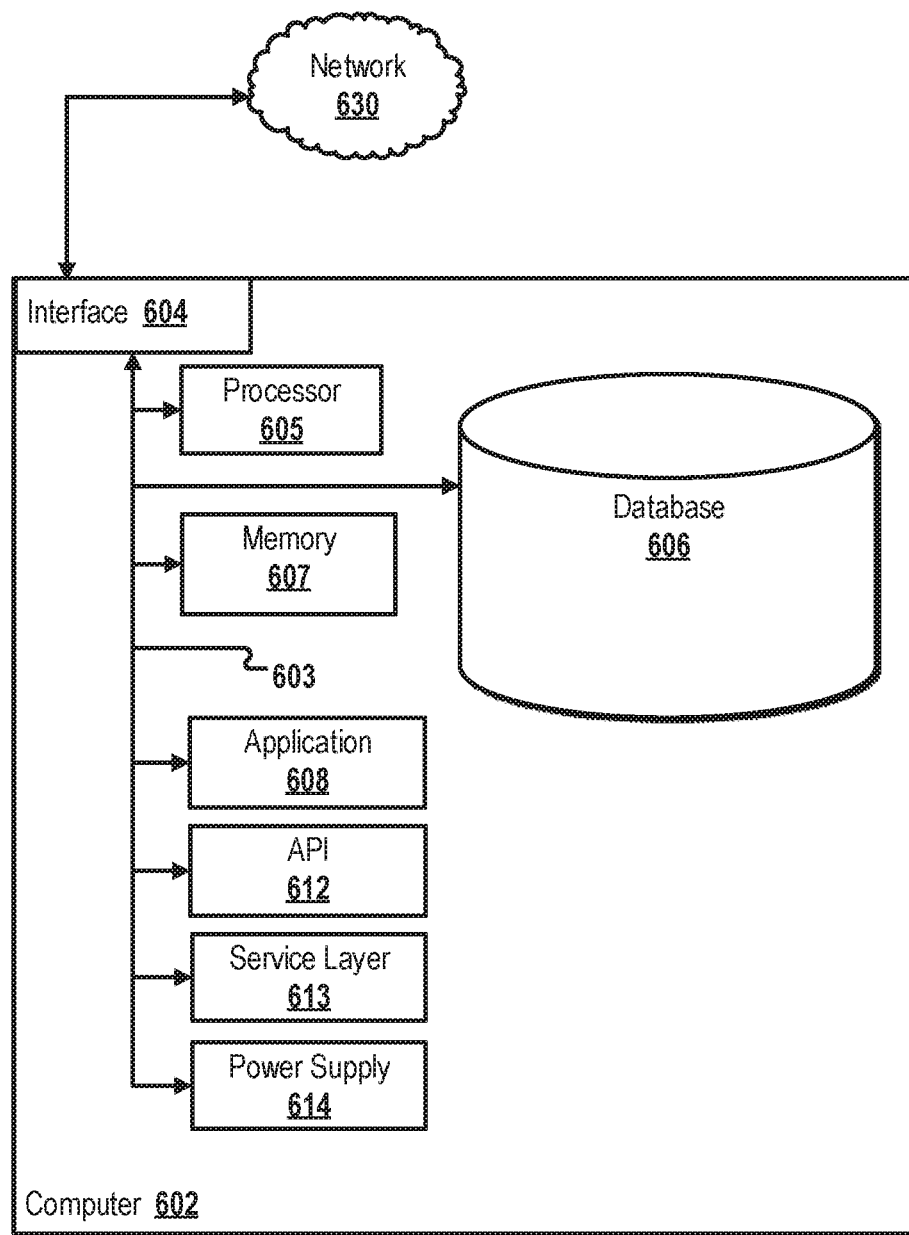
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 602 can include an input device, such as a keypad, keyboard, touch screen, another input device, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as a client, network component, a server, a database or another persistency, another role, or a combination of roles for performing the subject matter described in the present disclosure. The illustrated Computer 602 is communicably coupled with a Network 630. In some implementations, one or more components of the Computer 602 can be configured to operate within an environment, including cloud-computing-based, local, global, another environment, or a combination of environments.

At a high level, the Computer 602 is an electronic computing device operable to receive, transmit, process, store, or manage data and information associated with the described subject matter. According to some implementations, the Computer 602 can also include or be communicably coupled with a server, including an application server, e-mail server, web server, caching server, streaming data server, another server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory, conventional, or another type of database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: writing, by a data exchange platform, a data exchange agreement between a first user and a second user into a block chain, wherein the data exchange agreement is associated with first data; receiving, by the data exchange platform and from a first device associated with the first user, a first key, wherein the first key is used for decrypting encrypted first data; and transmitting, by the data exchange platform and to a second device associated with the second user, the received first key.

The foregoing and other described implementations can each, optionally, include one or more of the following features:

A first feature, combinable with any of the following features, wherein the data exchange platform stores the data exchange agreement.

A second feature, combinable with any of the previous or following features, further comprising: transmitting, by the first device and to the second device, the encrypted first data without passing through the data exchange platform; and decrypting, by the second device, the encrypted first data based on the first key to obtain the first data.

A third feature, combinable with any of the previous or following features, before writing the data exchange agreement into the block chain, the method further comprising: receiving, by the data exchange platform and from the first device, data information associated with the first data; publishing, by the data exchange platform, the data information associated with the first data; receiving, by the data exchange platform and from the second device, an order associated with the first data; transmitting, by the data exchange platform and to the first device, the order associated with the first data; and receiving, by the data exchange platform and from the first device, confirmation information for the order associated with the first data, wherein both the order and the confirmation information are associated with the data exchange agreement.

A fourth feature, combinable with any of the previous or following features, the method further comprising: before transmitting the received first key, receiving, by the data exchange platform and from the second device associated with the second user, a second key, wherein the second key is used for decrypting encrypted second data, and the second data is associated with the data exchange agreement; and after transmitting the received first key, transmitting, by the data exchange platform and to the first device associated with the first user, the received second key, wherein the first device decrypts the encrypted second data, received from the second device, based on the second key to obtain the second data.

A fifth feature, combinable with any of the previous or following features, after transmitting the received first key and before transmitting the received second key, the method further comprising: receiving, by the data exchange platform and from the second device associated with the second user, confirmation information for the first data, wherein the confirmation information for the first data indicates that the second user determines that the obtained first data conforms to the data exchange agreement.

A sixth feature, combinable with any of the previous or following features, after receiving the confirmation information for the first data, the method further comprising: receiving, by the data exchange platform and from the first device associated with the first user, confirmation information for the second data, wherein the confirmation information for the second data indicates that the first user determines that the obtained second data conforms to the data exchange agreement; writing, by the data exchange platform, a record indicating that data exchange between the first user and the second user is accomplished according to the data exchange agreement in the block chain; and storing, by the data exchange platform, the record.

A seventh feature, combinable with any of the previous or following features, the method further comprising: before transmitting the received first key, receiving, by the data exchange platform and from the second device associated with the second user, third data, wherein the third data is associated with the data exchange agreement; and after transmitting the received first key, transmitting, by the data exchange platform and to the first device associated with the first user, the received third data when a predetermined condition is satisfied.

An eighth feature, combinable with any of the previous or following features, wherein the predetermined condition includes that the data exchange platform receives an instruction from the second device, wherein the instruction is an instruction that instructs the data exchange platform to transmit the received third data to the first device.

A ninth feature, combinable with any of the previous or following features, wherein the data exchange agreement includes characteristic information of the first data, the method further comprising: acquiring, by the second device, the characteristic information of the first data, wherein the characteristic information of the first data includes at least one of a message digest for verifying integrity of the first data, and baseline information for summarizing specific content of the first data; and determining, by the second device, whether the obtained first data conforms to the data exchange agreement based on the acquired characteristic information of the first data.

A tenth feature, combinable with any of the previous or following features, wherein the encrypted first data is transmitted to the second device through a standard transmission interface of the first device, and the standard transmission interface is a universal interface defined by the data exchange platform and used for transmitting data between different devices.

In a second implementation, a non-transitory, computer-readable medium storing one or more instructions executable by a computer system to perform operations comprising: writing, by a data exchange platform, a data exchange agreement between a first user and a second user into a block chain, wherein the data exchange agreement is associated with first data; receiving, by the data exchange platform and from a first device associated with the first user, a first key, wherein the first key is used for decrypting encrypted first data; and transmitting, by the data exchange platform and to a second device associated with the second user, the received first key.

The foregoing and other described implementations can each, optionally, include one or more of the following features:

A first feature, combinable with any of the following features, wherein the data exchange platform stores the data exchange agreement.

A second feature, combinable with any of the previous or following features, the operations further comprising: transmitting, by the first device and to the second device, the encrypted first data without passing through the data exchange platform; and decrypting, by the second device, the encrypted first data based on the first key to obtain the first data.

A third feature, combinable with any of the previous or following features, before writing the data exchange agreement into the block chain, the operations further comprising: receiving, by the data exchange platform and from the first device, data information associated with the first data; publishing, by the data exchange platform, the data information associated with the first data; receiving, by the data exchange platform and from the second device, an order associated with the first data; transmitting, by the data exchange platform and to the first device, the order associated with the first data; and receiving, by the data exchange platform and from the first device, confirmation information for the order associated with the first data, wherein both the order and the confirmation information are associated with the data exchange agreement.

A fourth feature, combinable with any of the previous or following features, the operations further comprising: before transmitting the received first key, receiving, by the data exchange platform and from the second device associated with the second user, a second key, wherein the second key is used for decrypting encrypted second data, and the second data is associated with the data exchange agreement; and after transmitting the received first key, transmitting, by the data exchange platform and to the first device associated with the first user, the received second key, wherein the first device decrypts the encrypted second data, received from the second device, based on the second key to obtain the second data.

A fifth feature, combinable with any of the previous or following features, after transmitting the received first key and before transmitting the received second key, the operations further comprising: receiving, by the data exchange platform and from the second device associated with the second user, confirmation information for the first data, wherein the confirmation information for the first data indicates that the second user determines that the obtained first data conforms to the data exchange agreement.

A sixth feature, combinable with any of the previous or following features, after receiving the confirmation information for the first data, the operations further comprising: receiving, by the data exchange platform and from the first device associated with the first user, confirmation information for the second data, wherein the confirmation information for the second data indicates that the first user determines that the obtained second data conforms to the data exchange agreement; writing, by the data exchange platform, a record indicating that data exchange between the first user and the second user is accomplished according to the data exchange agreement in the block chain; and storing, by the data exchange platform, the record.

A seventh feature, combinable with any of the previous or following features, the operations further comprising: before transmitting the received first key, receiving, by the data exchange platform and from the second device associated with the second user, third data, wherein the third data is associated with the data exchange agreement; and after transmitting the received first key, transmitting, by the data exchange platform and to the first device associated with the first user, the received third data when a predetermined condition is satisfied.

An eighth feature, combinable with any of the previous or following features, wherein the predetermined condition includes that the data exchange platform receives an instruction from the second device, wherein the instruction is an instruction that instructs the data exchange platform to transmit the received third data to the first device.

A ninth feature, combinable with any of the previous or following features, wherein the data exchange agreement includes characteristic information of the first data, the operations further comprising: acquiring, by the second device, the characteristic information of the first data, wherein the characteristic information of the first data includes at least one of a message digest for verifying integrity of the first data, and baseline information for summarizing specific content of the first data; and determining, by the second device, whether the obtained first data conforms to the data exchange agreement based on the acquired characteristic information of the first data.

A tenth feature, combinable with any of the previous or following features, wherein the encrypted first data is transmitted to the second device through a standard transmission interface of the first device, and the standard transmission interface is a universal interface defined by the data exchange platform and used for transmitting data between different devices.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: writing, by a data exchange platform, a data exchange agreement between a first user and a second user into a block chain, wherein the data exchange agreement is associated with first data; receiving, by the data exchange platform and from a first device associated with the first user, a first key, wherein the first key is used for decrypting encrypted first data; and transmitting, by the data exchange platform and to a second device associated with the second user, the received first key.

The foregoing and other described implementations can each, optionally, include one or more of the following features:

A first feature, combinable with any of the following features, wherein the data exchange platform stores the data exchange agreement.

A second feature, combinable with any of the previous or following features, the operations further comprising: transmitting, by the first device and to the second device, the encrypted first data without passing through the data exchange platform; and decrypting, by the second device, the encrypted first data based on the first key to obtain the first data.

A third feature, combinable with any of the previous or following features, before writing the data exchange agreement into the block chain, the operations further comprising: receiving, by the data exchange platform and from the first device, data information associated with the first data; publishing, by the data exchange platform, the data information associated with the first data; receiving, by the data exchange platform and from the second device, an order associated with the first data; transmitting, by the data exchange platform and to the first device, the order associated with the first data; and receiving, by the data exchange platform and from the first device, confirmation information for the order associated with the first data, wherein both the order and the confirmation information are associated with the data exchange agreement.

A fourth feature, combinable with any of the previous or following features, the operations further comprising: before transmitting the received first key, receiving, by the data exchange platform and from the second device associated with the second user, a second key, wherein the second key is used for decrypting encrypted second data, and the second data is associated with the data exchange agreement; and after transmitting the received first key, transmitting, by the data exchange platform and to the first device associated with the first user, the received second key, wherein the first device decrypts the encrypted second data, received from the second device, based on the second key to obtain the second data.

A fifth feature, combinable with any of the previous or following features, after transmitting the received first key and before transmitting the received second key, the operations further comprising: receiving, by the data exchange platform and from the second device associated with the second user, confirmation information for the first data, wherein the confirmation information for the first data indicates that the second user determines that the obtained first data conforms to the data exchange agreement.

A sixth feature, combinable with any of the previous or following features, after receiving the confirmation information for the first data, the operations further comprising: receiving, by the data exchange platform and from the first device associated with the first user, confirmation information for the second data, wherein the confirmation information for the second data indicates that the first user determines that the obtained second data conforms to the data exchange agreement; writing, by the data exchange platform, a record indicating that data exchange between the first user and the second user is accomplished according to the data exchange agreement in the block chain; and storing, by the data exchange platform, the record.

A seventh feature, combinable with any of the previous or following features, the operations further comprising: before transmitting the received first key, receiving, by the data exchange platform and from the second device associated with the second user, third data, wherein the third data is associated with the data exchange agreement; and after transmitting the received first key, transmitting, by the data exchange platform and to the first device associated with the first user, the received third data when a predetermined condition is satisfied.

An eighth feature, combinable with any of the previous or following features, wherein the predetermined condition includes that the data exchange platform receives an instruction from the second device, wherein the instruction is an instruction that instructs the data exchange platform to transmit the received third data to the first device.

A ninth feature, combinable with any of the previous or following features, wherein the data exchange agreement includes characteristic information of the first data, the operations further comprising: acquiring, by the second device, the characteristic information of the first data, wherein the characteristic information of the first data includes at least one of a message digest for verifying integrity of the first data, and baseline information for summarizing specific content of the first data; and determining, by the second device, whether the obtained first data conforms to the data exchange agreement based on the acquired characteristic information of the first data.

A tenth feature, combinable with any of the previous or following features, wherein the encrypted first data is transmitted to the second device through a standard transmission interface of the first device, and the standard transmission interface is a universal interface defined by the data exchange platform and used for transmitting data between different devices.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/—R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method, comprising:
generating, by a data exchange platform, a secure data exchange agreement between a first user and a second user based at least on (i) data information associated with first data that belongs to the first user and that is to be exchanged with the second user, and (ii) an order that is associated with the first data and that was received from the second user;
writing, by the data exchange platform, the secure data exchange agreement between the first user and the second user into a block chain, wherein the secure data exchange agreement is associated with first data;

receiving, by the data exchange platform and from a first device associated with the first user, a first key for decrypting encrypted first data that is transmitted from the first device associated with the first user to a second device associated with the second user without passing through the data exchange platform; and in response to determining that the second user complies with the secure data exchange agreement, transmitting, by the data exchange platform and to the second device associated with the second user, the received first key for decrypting encrypted first data that is transmitted from the first device to the second device without passing through the data exchange platform;

before transmitting the received first key, receiving, by the data exchange platform and from the second device associated with the second user, a second key, wherein the second key is used for decrypting encrypted second data, and the second data is associated with the secure data exchange agreement; and after transmitting the received first key, transmitting, by the data exchange platform and to the first device associated with the first user, the received second key, wherein the first device decrypts the encrypted second data, received from the second device, based on the second key to obtain the second data, wherein after transmitting the received first key and before transmitting the received second key, receiving, by the data exchange platform and from the second device associated with the second user, confirmation information for the first data, wherein the confirmation information for the first data indicates that the second user determines that the obtained first data conforms to the secure data exchange agreement.

2. The computer-implemented method of claim 1, wherein the data exchange platform stores the data exchange agreement.

3. The computer-implemented method of claim 1, further comprising:

transmitting, by the first device and to the second device, the encrypted first data without passing through the data exchange platform; and decrypting, by the second device, the encrypted first data based on the first key to obtain the first data.

4. The computer-implemented method of claim 3, wherein the data exchange agreement includes characteristic information of the first data, the method further comprising:

acquiring, by the second device, the characteristic information of the first data, wherein the characteristic information of the first data includes at least one of a message digest for verifying integrity of the first data, and baseline information for summarizing specific content of the first data; and determining, by the second device, whether the obtained first data conforms to the data exchange agreement based on the acquired characteristic information of the first data.

5. The computer-implemented method of claim 3, wherein the encrypted first data is transmitted to the second device through a standard transmission interface of the first device, and the standard transmission interface is a universal interface defined by the data exchange platform and used for transmitting data between different devices.

6. The computer-implemented method of claim 1, before writing the data exchange agreement into the block chain, the method further comprising:

receiving, by the data exchange platform and from the first device, data information associated with the first data;

publishing, by the data exchange platform, the data information associated with the first data;

receiving, by the data exchange platform and from the second device, an order associated with the first data;

transmitting, by the data exchange platform and to the first device, the order associated with the first data; and receiving, by the data exchange platform and from the first device, confirmation information for the order associated with the first data, wherein both the order and the confirmation information are associated with the data exchange agreement.

7. The computer-implemented method of claim 1, after receiving the confirmation information for the first data, the method further comprising:

receiving, by the data exchange platform and from the first device associated with the first user, confirmation information for the second data, wherein the confirmation information for the second data indicates that the first user determines that the obtained second data conforms to the secure data exchange agreement;

writing, by the data exchange platform, a record indicating that data exchange between the first user and the second user is accomplished according to the secure data exchange agreement in the block chain; and storing, by the data exchange platform, the record.

8. The computer-implemented method of claim 1, the method further comprising:

before transmitting the received first key, receiving, by the data exchange platform and from the second device associated with the second user, third data, wherein the third data is associated with the data exchange agreement; and after transmitting the received first key, transmitting, by the data exchange platform and to the first device associated with the first user, the received third data when a predetermined condition is satisfied.

9. The computer-implemented method of claim 8, wherein the predetermined condition includes that the data exchange platform receives an instruction from the second device, wherein the instruction is an instruction that instructs the data exchange platform to transmit the received third data to the first device.

10. A non-transitory, computer-readable medium storing one or more instructions executable by a computer system to perform operations comprising:

generating, by a data exchange platform, a secure data exchange agreement between a first user and a second user based at least on (i) data information associated with first data that belongs to the first user and that is to be exchanged with the second user, and (ii) an order that is associated with the first data and that was received from the second user;

writing, by the data exchange platform, the secure data exchange agreement between the first user and the second user into a block chain, wherein the secure data exchange agreement is associated with first data;

receiving, by the data exchange platform and from a first device associated with the first user, a first key for decrypting encrypted first data that is transmitted from the first device associated with the first user to a second device associated with the second user without passing through the data exchange platform; and in response to determining that the second user complies with the secure data exchange agreement, transmitting, by the data exchange platform and to the second device associated with the second user, the received first key for decrypting encrypted first data that is transmitted from the first device to the second device without passing through the data exchange platform;

before transmitting the received first key, receiving, by the data exchange platform and from the second device associated with the second user, a second key, wherein the second key is used for decrypting encrypted second data, and the second data is associated with the secure data exchange agreement; and after transmitting the received first key, transmitting, by the data exchange platform and to the first device associated with the first user, the received second key, wherein the first device decrypts the encrypted second data, received from the second device, based on the second key to obtain the second data, wherein after transmitting the received first key and before transmitting the received second key, receiving, by the data exchange platform and from the second device associated with the second user, confirmation information for the first data, wherein the confirmation information for the first data indicates that the second user determines that the obtained first data conforms to the secure data exchange agreement.

11. The non-transitory, computer-readable medium of claim 10, wherein the data exchange platform stores the data exchange agreement.

12. The non-transitory, computer-readable medium of claim 10, the operations further comprising:
transmitting, by the first device and to the second device, the encrypted first data without passing through the data exchange platform; and
decrypting, by the second device, the encrypted first data based on the first key to obtain the first data.

13. The non-transitory, computer-readable medium of claim 10, before writing the data exchange agreement into the block chain, the operations further comprising:
receiving, by the data exchange platform and from the first device, data information associated with the first data;
publishing, by the data exchange platform, the data information associated with the first data;
receiving, by the data exchange platform and from the second device, an order associated with the first data;
transmitting, by the data exchange platform and to the first device, the order associated with the first data; and
receiving, by the data exchange platform and from the first device, confirmation information for the order associated with the first data, wherein both the order and the confirmation information are associated with the data exchange agreement.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
generating, by a data exchange platform, a secure data exchange agreement between a first user and a second user based at least on (0 data information associated with first data that belongs to the first user and that is to be exchanged with the second user, and (ii) an order that is associated with the first data and that was received from the second user;

writing, by the data exchange platform, the secure data exchange agreement between the first user and the second user into a block chain, wherein the secure data exchange agreement is associated with first data;

receiving, by the data exchange platform and from a first device associated with the first user, a first key for decrypting encrypted first data that is transmitted from the first device associated with the first user to a second device associated with the second user without passing through the data exchange platform; and in response to determining that the second user complies with the secure data exchange agreement, transmitting, by the data exchange platform and to the second device associated with the second user, the received first key for decrypting encrypted first data that is transmitted from the first device to the second device without passing through the data exchange platform;

before transmitting the received first key, receiving, by the data exchange platform and from the second device associated with the second user, a second key, wherein the second key is used for decrypting encrypted second data, and the second data is associated with the secure data exchange agreement; and after transmitting the received first key, transmitting, by the data exchange platform and to the first device associated with the first user, the received second key, wherein the first device decrypts the encrypted second data, received from the second device, based on the second key to obtain the second data, wherein after transmitting the received first key and before transmitting the received second key, receiving, by the data exchange platform and from the second device associated with the second user, confirmation information for the first data, wherein the confirmation information for the first data indicates that the second user determines that the obtained first data conforms to the secure data exchange agreement.

15. The computer-implemented system of claim 14, wherein the data exchange platform stores the data exchange agreement.

16. The computer-implemented system of claim 14, the operations further comprising:
transmitting, by the first device and to the second device, the encrypted first data without passing through the data exchange platform; and
decrypting, by the second device, the encrypted first data based on the first key to obtain the first data.

17. The computer-implemented system of claim 14, before writing the data exchange agreement into the block chain, the operations further comprising:
receiving, by the data exchange platform and from the first device, data information associated with the first data;
publishing, by the data exchange platform, the data information associated with the first data;
receiving, by the data exchange platform and from the second device, an order associated with the first data;
transmitting, by the data exchange platform and to the first device, the order associated with the first data; and
receiving, by the data exchange platform and from the first device, confirmation information for the order associated with the first data, wherein both the order and the confirmation information are associated with the data exchange agreement.

* * * * *